United States Patent
Hobson et al.

(10) Patent No.: US 6,665,814 B2
(45) Date of Patent: Dec. 16, 2003

(54) METHOD AND APPARATUS FOR PROVIDING SERIALIZATION SUPPORT FOR A COMPUTER SYSTEM

(75) Inventors: Stephen James Hobson, Hampton (GB); Paul Kettley, Winchester (GB); Anthony John O'Dowd, Winchester (GB); Peter Siddall, Romsey (GB); James Henry Warnes, Dutchess, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/725,578

(22) Filed: Nov. 29, 2000

(65) Prior Publication Data

US 2002/0066051 A1 May 30, 2002

(51) Int. Cl.[7] .................................................. G06F 11/00
(52) U.S. Cl. ........................... 714/16; 714/15; 709/104; 709/313; 709/314
(58) Field of Search .............................. 714/15, 16, 17; 709/313, 314, 105, 104, 102, 226

(56) References Cited

U.S. PATENT DOCUMENTS

| 5,161,227 | A | * | 11/1992 | Dias et al. ................... 709/104 |
| 5,465,328 | A | * | 11/1995 | Dievendorff et al. ......... 714/15 |
| 6,055,637 | A | * | 4/2000 | Hudson et al. .............. 713/201 |
| 6,339,793 | B1 | * | 1/2002 | Bostian et al. .............. 709/229 |
| 6,401,216 | B1 | * | 6/2002 | Meth et al. ................... 714/16 |
| 6,529,932 | B1 | * | 3/2003 | Dadiomov et al. .......... 709/101 |
| 6,584,581 | B1 | * | 6/2003 | Bay et al. ..................... 714/16 |
| 2002/0052959 | A1 | * | 5/2002 | Freitas et al. ............... 709/226 |
| 2002/0124013 | A1 | * | 9/2002 | Loy et al. ................... 707/204 |

\* cited by examiner

Primary Examiner—Scott Baderman
Assistant Examiner—Yolanda L Wilson
(74) Attorney, Agent, or Firm—Gregory M. Doudnikoff

(57) ABSTRACT

Provided are a method and apparatus for providing serialization support for computer systems and computer system resources, in particular for application programs which require sequencing and/or consistency of data. The computer system resource includes serialized processes with units of work. A serialization token is provided at the start of a serialized process including at least one unit of work. The serialization token remains in force until the or all of the units of work of the process have been committed or rolled back. The serialization token controls the commencement of other processes of the computer system during the time that it is in force. The serialization is carried out by storing an abstract representation of the process to be serialized in storage which is accessible by all the programs and computers where the serialization applies. In this way, if a process fails, the serialization token remains in force until the process has recovered and has committed or rolled back the units of work in the process. The serialization token can allow only a single thread process or, alternatively, the serialization token can allow a multiple thread process in which the threads have the same serialization token which allows for multiple users.

38 Claims, 4 Drawing Sheets

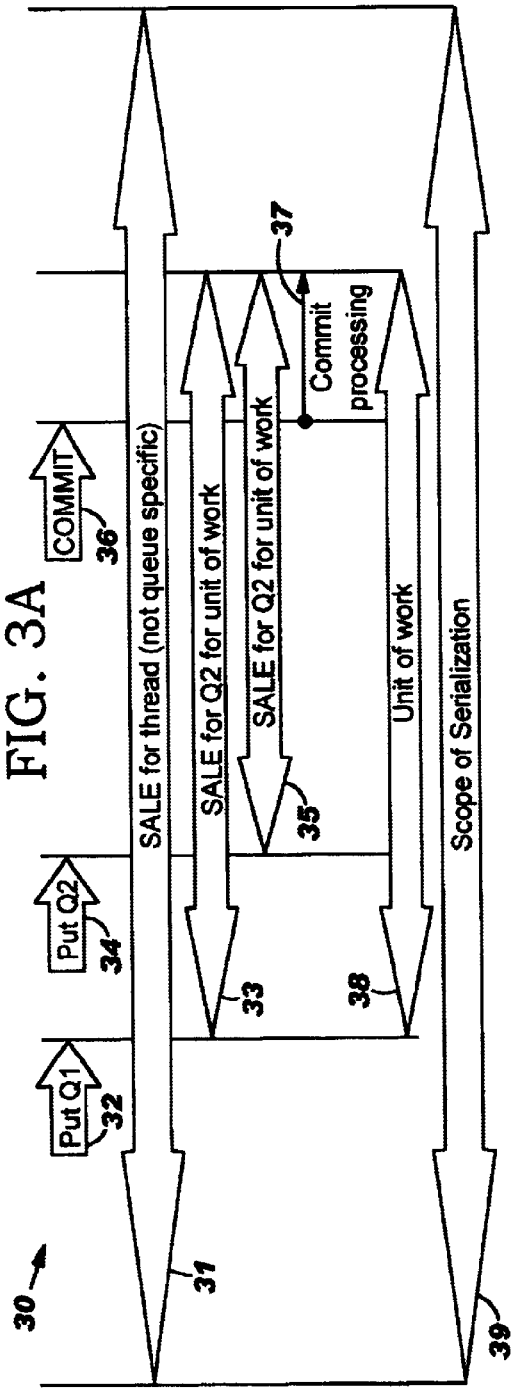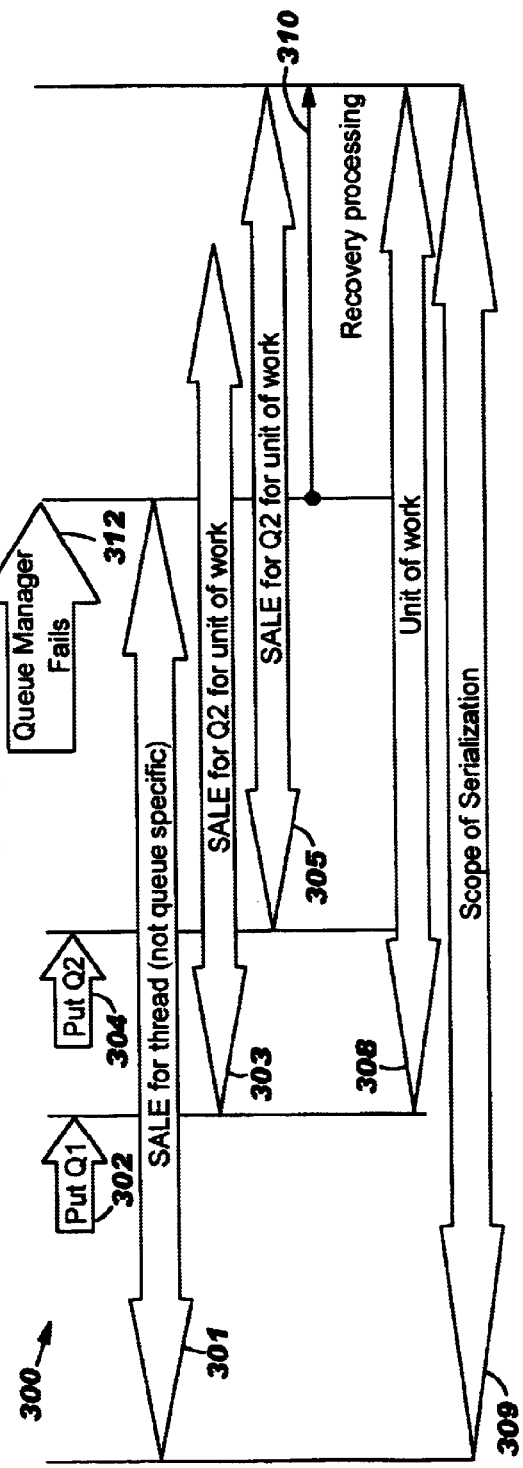

METHOD AND APPARATUS FOR PROVIDING SERIALIZATION SUPPORT FOR A COMPUTER SYSTEM

BACKGROUND OF THE INVENTION

1. Field of the Invention

The present invention relates to the field of computer systems, and more particularly to a method and apparatus for providing serialization support for a computer system or system resource, such as for a computer application program which requires sequencing of data.

2. Description of the Related Art

In the operation of computer systems, computer application programs often require serialization of the data they are operating on such that the data is handled in a particular sequence. It is very important in some application programs to maintain the sequence and/or the consistency of the data being handled.

Any application program that updates resources may fail while it has an active unit of work in progress. A unit of work is a series of operations performed by an application between two points of consistency. If the application has a requirement for sequencing of data and/or consistency of data then it may require that before the application can restart, the unit of work that was in progress at the time of failure is either completely rolled back or completely rolled forward.

A unit of work is rolled back when the transaction is stopped and the application is returned to its previous state prior to the commencement of the unit of work. A unit of work is rolled forward when an application recovers from a disaster, such as a power failure, by reading a transaction log and re-executing all instructions or by using other techniques to return the application to the state before the disaster in order that the unit of work can continue and, once completed, be committed.

As an example, the application program may perform units of work on a resource manager, such as a queue manager for managing communication between application programs running on different computers in a network. However, this disclosure is applicable to any application that has a requirement for sequencing of data and consistency of data.

Known serialization techniques for programs are known in the art as locking or latching. In the following, the term "locks" is used to cover locks and latches.

Known locking methods use a token, sometimes called a lock name, derived by the application programs and representing the process to be serialized. The application program requests ownership of the lock by passing the lock name to a specialised program called a lock manager. When the process is complete, the application releases ownership of the lock, again by passing the lock name to the lock manager program.

When the application requests ownership of a lock, if the lock is already owned by another application or by another copy of the same application then the lock manager either refuses to assign ownership, delays assigning ownership until the previous owner has released ownership, or grants shared ownership of the lock. Which of these it does depends on the lock manager implementation and/or on additional parameters passed by the application and/or on a lock definition process independent of the programs involved.

If an application program fails while holding ownership of a lock, its lock ownership can be released by the lock manager (as in the Enqueue/Dequeue ENQ/DEQ mechanism) or its ownership can be remembered by the lock manager (as in the lock management facilities provided with IBM Corporation's OS/390 operating system's cross-system extended services (XES)) so that other copies of the program and/or other programs needing the lock vary their mode of operation to take into account the failed lock holder.

In cases where a process is performed cooperatively and in parallel by several copies of a program, known locking methods have disadvantages. For example, complex and possibly inefficient protocols are required to transfer lock ownership when one program fails part way through a process and another program continues where the failed program stopped. Additional protocols may be required to identify when all components of the process (which are possibly being performed independently and in parallel) are complete and/or to identify which components remain to be done. Some form of coordination program is therefore required in the known systems.

It is an object of the present invention to provide a method of serialization support which avoids assigning ownership of the process to a particular program, application or computer. This simplifies the programming and avoids or reduces performance problems such as contention. It also avoids the requirement for a coordinating program which also simplifies the programming.

SUMMARY OF THE INVENTION

The present invention provides serialization support for a computer system or computer system resource, such as an application program, in order to maintain the sequence and/or consistency of data.

According to a first aspect of the present invention there is provided a method for providing serialization support for a computer system resource which includes processes requiring serialization, the method including: commencing one of the processes requiring serialization; creating a representation of the process and providing the representation on a medium accessible by all components of the computer system to which the serialization requirement applies; deleting the representation when the process is complete; on commencement of a further one of the processes requiring serialization, checking for the existence of the representation on said accessible medium and, if said representation check is positive, controlling serialization of said processes.

Preferably, the representation on the accessible medium includes a serialization token, and the controlling of serialization is performed with reference to the serialization token. This serialization token is preferably allocated to a process by the application program (or other system resource) that the process is part of. Alternatively, the serialization token could be allocated by a serialization controller.

Preferably, the serialization token has a locking protocol mapping to the process representation. A serialization token for a process may be used to prevent other processes commencing during the time that it is in force. Alternatively, the serialization control using serialization tokens may allow multiple processes to commence, but may prevent processes other than the first process from performing certain processing tasks. The serialization token may allow commencement of multiple processes performed on behalf of resource managers within a cooperating group while preventing commencement of other processes.

Preferably, the process representation includes at least one entry, each entry representing an element of the process, wherein each element can be performed independently. Each entry may be created, modified and deleted as the element is processed.

In the event of a failure during a process, the locking protocol is persistent until recovery across all the elements of the representation is complete. Each element of the process is recovered to a consistent state and the corresponding entry in the representation is then deleted, the representation persisting until the last entry is deleted.

Optimally, each element of the representation can be performed and recovered in parallel with the other elements.

Preferably, the serialized processes run on a plurality of subsystems which share a storage space, and the representation is provided in the shared storage space. The shared storage space may be one of a shared database, a shared file system or a coupling means between the subsystems.

In an embodiment, the computer system includes one or more queue manager programs and the serialized processes are message communication processes from application programs connected to the queue manager, each process including at least one unit of work. The computer system may use an application programming interface to indicate to the queue manager the commencement of a process with a serialization token. The elements of the process represented by entries in the representation may include threads of a process, units of work and individual queues on which units of work act. An entry for a unit of work is deleted when the unit of work is rolled forward or back for each queue that it acts on.

Preferably, the computer system is a plurality of subsystems each with a queue manager, the subsystems coupled together by a coupling means which has shared storage space on which the representation is stored in the form of a list structure. In the event of a failure during a process, other queue managers can access the shared storage space to recover the elements of the process independently and in parallel.

According to a second aspect of the present invention there is provided a computer system having serialization support, the computer system comprising one or more components on which serialized processes run, wherein a process which is active has an allocated serialization token, the computer system also comprising a medium which is accessible by the one or more components on which a representation of the active process is created, modified and deleted during the process. The representation is referenced by the serialization token and its existence is used in the control of serialization.

According to a third aspect of the present invention there is provided a method for providing serialization support for a computer system comprising a plurality of subsystems with a shared memory space, the subsystems having a plurality of processes, wherein a process is allocated a serialization token which has a locking protocol mapping to a list structure representing the process in the shared memory space, the locking protocol enabling the plurality of processes to serialize with each other.

According to a fourth aspect of the present invention there is provided a computer program product stored on a computer readable storage medium, comprising computer readable program code means for performing the steps of a method for serializing processes, the method including: commencing one of a set of processes requiring serialization; creating a representation of the process, the representation including a respective serialization token for the process; providing the representation on a medium accessible by all components of the computer system to which the serialization requirement applies; deleting the representation when the process is complete; on commencement of a further one of the processes requiring serialization, checking for the existence of the representation on said accessible medium and, if said representation check is positive, controlling serialization of said processes with reference to said serialization token.

BRIEF DESCRIPTION OF THE DRAWINGS

Embodiments of the invention will now be described in more detail, by way of example only, with reference to the accompanying drawings in which:

FIGS. 3a and 3b show representations of a thread with a unit of work in accordance with the method and apparatus of the present invention;

DESCRIPTION OF THE PREFERRED EMBODIMENT

Figure 1:
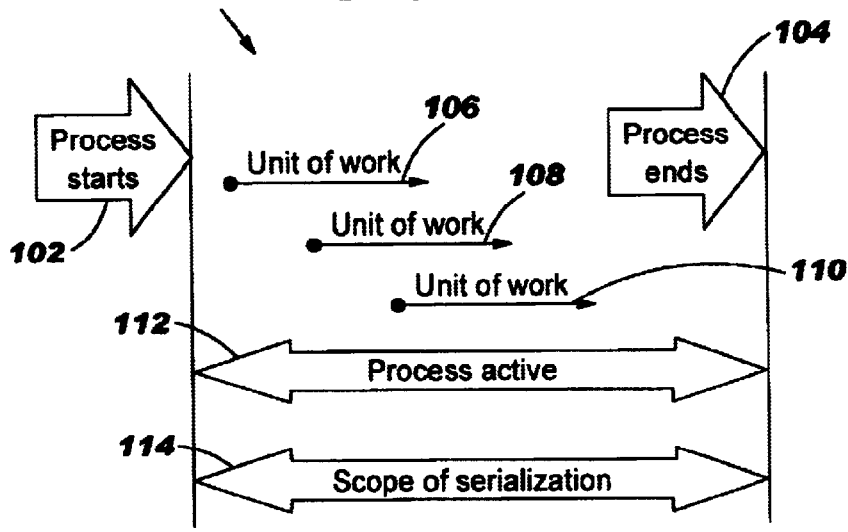
FIG. 1 shows a representation of a series of units of work in a process in accordance with the method and apparatus of the present invention.

There is now described a serialization support method and apparatus for a computer system, such as an application program. The serialization support operates by allowing an application to specify a serialization token to be associated with a current application program and one or more units of work created by that program. There is also described the associated behaviours of the application program if a failure occurs when the serialization token is held.

An embodiment of the present invention is described in specific terms in the context of application programs with units of work acting on a middleware program in the form of a resource manager, in this case a queue manager. Application programs running on different computers within a network are enabled to communicate and hence interoperate using communications manager products such as queue manager software products. Each node of the network has a queue manager which enables communication between the application programs running on the computers in different nodes of the network.

In communication of message data between application programs through a computer network, it is known to transmit the messages by means of queue managers that interface to the application programs through a message queue interface that is invoked by the application programs. The serialization support is used within the queue manager program, to allow an application to serialize processes which include units of work.

A unit of work is a term that refers to a series of operations performed by an application between two points of consistency. A unit of work begins when a transaction starts or after a user-requested synchronisation point to (syncpoint). It ends either at a user-requested syncpoint or at the end of a transaction. A unit of work may involve an application performing a set of operations such as getting a message from a queue, making a database entry based on the contents of the message and putting a different message back onto a queue indicating the results of the database operation.

When the thread of operations that are executed in a unit of work reaches a synchronisation point, they can either be done (known in the art as committed) or undone (known in the art as backed-out or aborted). When an application is part way through the thread of operations in a unit of work, it is known as in-flight.

Synchronisation points can be illustrated by considering the case of electronic points of sale. A transaction is enacted at an electronic point of sale, for example in a shop, and the transaction is recorded and stored until it can be sent to a handling agency, usually a bank. The bank must ensure that both halves of the transaction occur, namely the subtraction of money from the customer's account and the addition to the retailer's. The sale is recorded and sent to a sales message queue. The bank application program gets a message from the sales queue and instructs the debit program to remove funds from a customer account. The credit program places the funds into the retailer's account. Updates to the resources constitute a single unit of work.

If an application program that updates resources, such as the resources of a queue manager, fails or abnormally terminates while it is in-flight and has an active unit of work in progress, the sequence and consistency must be maintained. The application detects the failure and, before the application can restart, the unit of work that was in progress at the time of failure is either completely rolled back or completely rolled forward. A unit of work is rolled back when the transaction is stopped and the application is returned to its previous state prior to the commencement of the unit of work. A unit of work is rolled forward when an application recovers from a disaster, such as a power failure, by reading a transaction log and re-executing all instructions or by using other techniques to return the application to the state before the disaster in order that the unit of work can continue.

A queue manager program may be a single local queue manager which manages queues for a computer within the network. A group of queue managers can form a queue sharing group in which the queue managers all have access to a shared message queue to enable parallel processing of messages by application programs connected to any one of the set of queue managers.

A plurality of queue manager programs can be coupled together through a coupling facility (CF). The message data is communicated via shared queues which are held in the coupling facility. The coupling facility is usually configured to run on a different power supply to any of the queue managers and is generally resilient to software and hardware failures and power outages. List structures are used to store messages in the coupling facility. The coupling facility comprises a microprocessor unit and list structures and is connected to a shared data repository which holds shared queue definitions. The data repository and the coupling facility are accessible from all the queue managers that share the queues, known as the queue sharing group. The shared repository can be a data sharing DB2 database (DB2 is a trademark of IBM Corporation). The coupling facility also has an administrative structure.

A coupling facility list structure is dedicated to a specific queue sharing group, but a coupling facility can hold structures for more than one queue sharing group.

Each queue manager includes a coupling facility manager component which provides connection services for connecting to the coupling facility list structure to perform operations on list structure entries such as read, write, delete, connect, disconnect, update and move. The coupling facility manager component handles all requests to the coupling facility with appropriate levels of concurrency, serialization and integrity. A DB2 manager component controls requests to the DB2 database including initiating connect and disconnect from the database and read, write, delete and update services.

In the queue sharing group environment, an application can connect to any of the queue managers within the queue sharing group and as all the queue managers can access the same set of shared queues, the application does not depend on the availability of a particular queue manager. The queue managers in the queue sharing group can service any queue.

To further enhance availability of messages in a queue sharing group, the queue managers can detect if another queue manager in the group disconnects from the coupling facility abnormally, and, where possible, complete units of work for that queue manager that are still pending. This is known as peer recovery.

If a queue manager terminates abnormally at a point where an application is part way through a process and has retrieved a request message from a queue but has not yet put the response message or committed the unit of work, another queue manager in the group detects the failure and backs out the in-flight units of work of the process being performed on the failed queue manager. This means that the request message is put back on to the request queue and is available for one of the other server instances to process without waiting for the failed queue manager to restart. A problem arises if the application process is restarted somewhere else in the group and the application process could reopen the queues it previously had opened, before all peer level recovery is complete for the failed queue manager. In other words, the application process could begin accessing shared queues before all its messages from the previous failed attempt have been backed out or committed. This problem is solved by the serialization support of the present invention.

In a queue sharing group arrangement, the program in the form of the queue manager runs several copies, usually but not necessarily on different computers, which act cooperatively and in parallel on the same shared data. It is possible in such a shared data cooperative processing environment to have more than one copy of the program work together cooperatively to roll forward or backward a unit of work. In particular, if there is logical partitioning of the data which a unit of work modifies then different copies of the program can roll forward or backward a unit of work in parallel. One copy of the program can roll forward or backward the portion of the unit of work which modifies one partition and can run in parallel with another copy which rolls forward or backward another portion of the same unit of work which modifies another partition.

A serialized application specifies a serialization token or connection tag when it connects to the queue manager, the serialization token being unique to that application. Any units of work performed by the application are marked with the serialization token. In the case of a queue sharing group of queue managers, the queue manager ensures that units of work within a queue sharing group with the same serialization token are serialized.

The present invention uses a serialization token or connection tag to maintain the sequence and consistency of an application. The serialization token is a piece of information or internal code which is derived by the application program.

To invoke the serialization support of the serialization token, the application uses an application programming interface which indicates the start of a serialized process. The serialization token indicates that a process is in progress and as long as a serialization token is in force, there is a serialization scope which will not be interrupted by another process, unless allowed by the serialization token.

Serialization support is needed for applications that depend on the exact sequence of messages in a queue. For example, certain types of applications might have to ensue that messages are retrieved from a queue in exactly the same order as they arrived on the queue. Serialization support can be used to prevent an application from restarting after a failure of a queue manager or of the application until all commit and back out operations for the previous execution of the application are complete. These could be carried out by peer recovery described above. Serialization support can also be used to prevent an application from starting when another instance of the same application is already running.

The serialization token may allow only one application process with that token to operate or, alternatively, it may allow certain multiple application processes to share the token. The serialization token allows the application to enforce:

1. Single Thread support—in order to specify that another application with the same serialization token cannot be started it there is already an identical serialization token active.
2. Multi-Thread support—in order to specify that another application with the same serialization token cannot be started if there is already an identical serialization token active unless the token allows for many users and the new application is eligible to be a part of multiple threads sharing the token.

An existing token may relate to a currently active application that has suffered no failures or an application that is in the process of being rolled back or rolled forward by completing, for example, rollback/backout or commit commands.

The queue manager receives a call from an application programming interface with an application process and an associated serialization token.

If there is no active or recovering process with a serialization token already in use by the queue manager application, the queue manager accepts the application programming interface call and establishes that there is now an active process with the serialization token. If the queue manager is not a sharing queue manager then the serialization token is only known on that queue manager. If the queue manager is a part of a group of sharing queue managers then the serialization token is known by all of the queue managers that make up the group of data sharing queue managers.

Alternatively, if there is already an active process with a serialization token, the queue manager rejects the application programming interface call. If the queue manager is not a sharing queue manager then the serialization token has already been created by an application known to this queue manager. If the queue manager is a part of a group of sharing queue managers then the serialization token has already been created and may have been created by an application known to any member of the group of sharing queue managers.

When the process completes, after commit or rollback is complete for all the units of work of the process, there is no longer an active process with the serialization token and a new process using the same token can now start. This is illustrated in FIG. 1. FIG. 1 shows an application 100 in progress. A process in the application starts 102 if a serialization token is accepted by the application. At the time of the process start 102, the process can be defined as becoming active 112 and the scope of the serialization token starts 114. During the process various units of work 106, 108, 110 are carried out. If all the units of work 106, 108, 110 are completed, the process ends 104 and the process ceases to be active. The scope of the serialization token 114 also ends.

Figure 2:
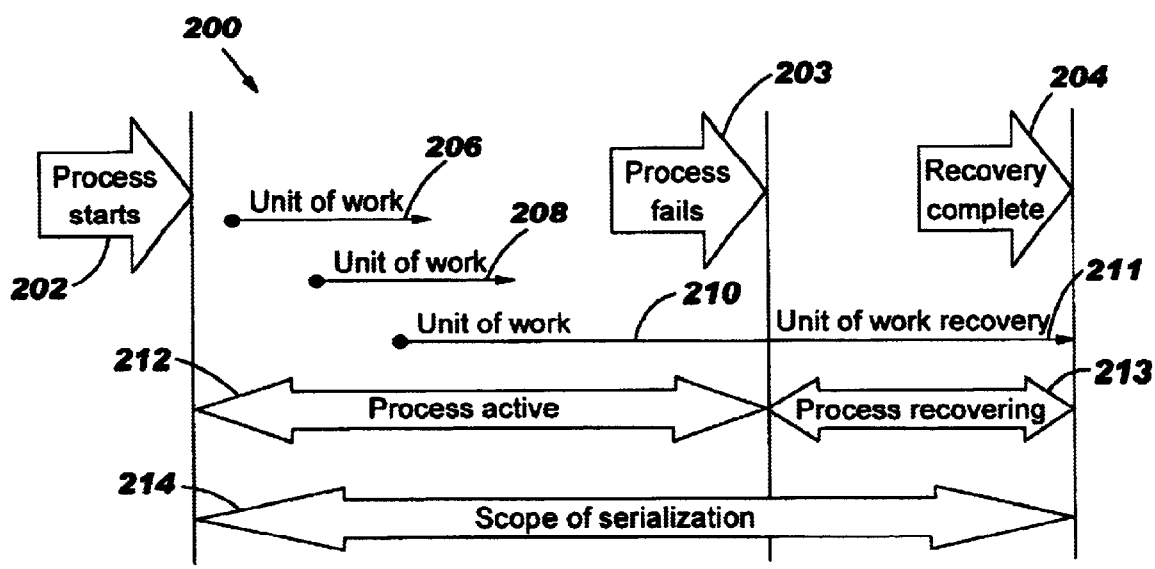
FIG. 2 shows a representation of a series of units of work in a process, including a process failure, in accordance with the method and apparatus of the present invention.

When the process terminates before commit or rollback is complete for all its units of work, a new process using the same serialization token cannot start until the unit of work forward completes or backs out for the process. This is illustrated in FIG. 2. FIG. 2 shows a similar application 200 in process to that of FIG. 1 with a process start 202 at which point the process is defined as becoming active 212. The scope of the serialization 214 commences with the process becoming active 212. During the process various units of work 206, 208, 210 are carried out by the application. If the process fails or terminates 203 before all the units of work 206, 208, 210 are complete, for example, if commit or rollback is not complete for one or more units of work 210, a new process using the same serialization token cannot start. This type of process termination could occur when a single local queue manager fails or when the entire group of data sharing queue managers fail.

The scope of the serialization 214 continues although the process is no longer active 212. The unit of work 210 that has not been completed then recovers by forward completing or backing out of the process 211. During the time of the recovery of the unit of work 211, the process is recovering 213 and the serialization token is still in effect preventing the process from being interrupted. When the recovery of the unit of work 210 is complete the process recovery is complete 204 and the scope of serialization 214 of the serialization token can end.

If an application programming interface tries to activate a further process with the same serialization token before the scope of the current serialization is complete, the queue manager will reject the further process. The application programming interface can retry after a period of time or the operator can restart the application or take other similar action.

The serialization is accomplished by storing a representation of the process in storage which is accessible by all programs and computers where the serialization applies. This representation is placed in the shared storage at the start of the process, modified during the progress of the process, and deleted at the completion of the process. This allows any new instance of the process to check for an incomplete prior instance by checking if a representation of the process exists on the shared storage.

MQSeries

The above generally describes serialization support in the context of a queue manager program. A specific example is now used to illustrate the serialization support further in the context of IBM Corporation's MQSeries message queuing software products. Message queuing and commercially available message queuing products are described in "Messaging and Queuing Using MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference"(IBM Document number SC33-0850-01). The network via which the computers communicate using message queuing may be the Internet, an intranet, or any heterogeneous or homogeneous data processing network. (IBM and MQSeries are trademarks of IBM Corporation).

IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept "in doubt" and can be backed out atomically in the event of a failure. This message transmission protocol and the associated transactional concepts and recovery facilities are described in international patent application No. WO Ser. No. 95/10805 and U.S. Pat. No. 5,465,328, which are incorporated herein by reference.

The message queuing inter-program communication support provided by the MQSeries products enables each application program to send messages to the input queue of any other target application program and each target application can asynchronously take these messages from its input queue for processing. The communication manager component which manages queues and provides services for the assured delivery of messages between application programs, including achieving interoperability between applications in a distributed heterogeneous network, is known as the queue manager. The component which handles transfer of a message from an outgoing transmission queue of a sender queue manager across the network to an input queue of a receiver queue manager is known as a mover.

IBM Corporation's MQSeries product family includes queue manager application programs for a large number of different operating system and hardware platform environments, providing the messaging and queuing services to application programs through program calls from its application programming interface, Message Queue Interface (MQI).

In IBM's OS/390 operating system environment, application programs connect to a given queue manager through an adapter (for example, the MQI call MQCONNX for establishing a connection of an application to a queue manager will be sent from the application-hosting environment via an adapter). The adapter that is used depends on the type of application program. For example, an application program written for IBM's CICS transaction server product would connect through the CICS Adapter. (CICS and OS/390 are trademarks of IBM Corporation).

An MQSeries unit of work begins with the first in-sync point MQGET (to get a message from a queue) or MQPUT (to put a message into a queue) and ends with an explicit commit (MQCOMMIT) or backout (MQBACK), or an implicit commit (at MQDISC or normal end-of-task) or backout (abnormal end-of-task).

A serialization token is provided in the form of a 128-byte token. A call from the Message Queuing Interface to commence an application process identifies the token to the queue manager.

As mentioned above the serialization is accomplished by storing a representation of the process in storage which is accessible by all programs and computers where the serialization applies.

In the implementation of the invention in the MQSeries, the representation is stored in a list structure in a coupling facility (CF) that all queue managers in a queue sharing group can access. In this way the serialization token provides a locking protocol which maps to list structures in shared storage space.

An application can check the existence of the representation if the shared storage provides keyed access. The serialization token can be used as the key for keyed access to the representation. Alternatively, as will be appreciated by a person skilled in the art, a hash of the serialization token can be used as the key.

The actual representation comprises a set of data items, each retrievable using the same key. Each item existing on the shared storage represents a component of the process which can be rolled forward or backward independently of and in parallel with other components.

For example, in the case of the MQSeries implementation, the data items are referred to as serialized application list entries (SALEs). One data item or SALE represents the process or thread of the process actively executing. Its existence prevents another instance starting whether or not the process has yet done any data modification. Other data items (SALEs) represent units of work within the process, and yet other data items (SALEs) represent the set of changes to a specific queue. As each component completes, the corresponding SALEs are deleted. A single scope of serialization can be maintained by one or more SALEs. Provided that there is always at least one SALE at any one time, it does not matter if there is more than one.

As defined above, a process can be a single threaded process in which units of work are carried out sequentially or a multi-threaded process in which multiple applications operate consecutively. In a multi-thread process, each thread is represented by a data item or SALE in the list structure. SALEs use a dedicated list header (the SALH) in the administrative structure.

In the event of a recovery from a failure, different queue managers can roll forward or backward the changes to different queues performed by the same unit of work. Thus if a unit of work modifies queues queue_a and queue_b then one queue manager can roll forward or backward the changes to queue_a at the same time as and in parallel with another queue manager rolling forward or backward the changes to queue_b.

The SALE representing a serialized thread of an application process associates the thread with the serialization token for the process and is created at the start of each thread in the serialized process by a call to CSQESAPP which occurs at the connection time of an application to a queue manager (MQCONNX) and the SALE continues to exist until the end of the thread.

An optional serialization test comprises checking if there is already a SALE with the serialization token provided in the CSQESAPP call. If there is then the test "fails" and the process cannot proceed. If there is not then the test "passes" and the process can proceed.

A process with a number of SALEs is shown in FIG. 3a. A process 30 has a thread which commences and a SALE 31 is created for the thread. Within the thread, a unit of work 38 is to be done which involves putting a message to a first queue Q1 and a second queue Q2. At the put command 32 to the first queue Q1, a SALE 33 is created for the unit of work on first queue which exists during the time that the unit of work 38 is active on the first queue Q1. At the put command 34 to the second queue Q2, a SALE 35 is created for the unit of work on the second queue Q2. When the unit of work 38 is completed on the two queues, it is committed by a commit command 36. The two SALEs 33, 35 for the two queues are deleted once the commit process 37 is completed and the unit of work 38 is committed. The SALE 31 for the thread which is not queue specific, is deleted when all the units of work for the thread have been completed. The scope of serialization 39 is the period where there is at least one SALE active.

If a queue manager fails, the SALE for the thread is deleted but the SALEs for the units of work within that thread persist until either unit of work recovery forward completes or aborts the units of work, or until queue recovery completes backout of all in-flights for each queue. A failed process is shown in FIG. 3b.

FIG. 3b shows a process 300, which is similar to the process of FIG. 3a. A thread commences in the process and a SALE 301 is created for the thread. A thread includes a unit of work 308 which involves putting a message to first and second queues Q1, Q2. At the put command 302 to put the message to the first queue Q1, a SALE 303 is created. At the put command 304 to put the message to the second queue Q2, a SALE 305 is created. At the failure of the queue manager 312, the SALE 301 for the thread is deleted but the SALEs 303, 305 for the unit of work in each queue persist. A recovery process 310 can act on the individual components of the unit of work in the first and second queues to recover the components of the unit of work in parallel. The SALEs 303, 305 for the unit of work are deleted as the component of the unit of work is committed or rolled back. The scope of serialization 309 is the period where there is at least one SALE active.

In the implementation in the MQSeries product, since the application serialization token is 128 bytes, and the maximum key length for CF list structure searches is 32 bytes, CF manager generates a 32-byte hash of the 128-byte token and uses that as a key to search the list. To resolve hash synonyms, the CF manager stores the full 128-byte token within the SALE itself.

The following CF list entry attributes are used for locating and processing SALEs:
Primary key:
   QueueManager.Code or QueueManager.Code.Structure.List
Secondary key:
   32-byte hash of serialization token
Version:
   QueueManager.Thread or unit of work ID The secondary key can be used to select all SALEs for a given serialization token. Although, the SALEs themselves must be retrieved, and the full serialization token which they contain compared, because the same hashed token can be derived from different tokens.

The primary key can be used to select (for deletion) all SALEs for a given queue manager or queue manager and queue. Code is a 1-byte indicator, one of:
SALE is not queue-specific, relates to a thread
SALE is not queue-specific, relates to a unit of work
SALE is queue-specific
SALE is "in doubt"

The version can be used to select (for deletion) all SALEs for a given unit of work or for a given thread.

As SALEs are accessed by a secondary key, the administration structure must be defined as an indexed structure.

The following is a summary of the implementation of the serialization token in the MQSeries embodiment.

The CF manager processes a MQCONNX command as follows:
1. Compute a 32-byte hash of the 128-byte serialization token.
2. Using the 32-byte hashed serialization token as the secondary key, scan the SALEs on the SALH.
   If there are no matching SALEs then proceed to step 3.
   If a match is found on secondary key (one or more entries), read the corresponding SALEs to fetch the 128-byte token. If there is then a match on the 128-byte token, the MQCONNX request fails and the caller receives a non-zero reason code.
   If there is no match on the 128-byte token then this is an instance of a hash collision.
   Proceed to step 3.
3. Create a SALE. This is a not-queue-specific SALE which persists until thread termination. Its secondary key is the 32-byte hashed token. Within the SALE is stored the 128-byte token. The SALE's version number is set to the queue manager ID and the CF manager thread block address.
4. Set a flag in the thread block address to indicate that the unit of work is serialized. Also save the 32-byte hashed serialization token and a pointer to the 128-byte serialization token.
5. Return control to the caller, MQCONNX successful.

Steps 2 and 3 must be serialized against MQCONNX processing by any other queue manager within the queue sharing group. The CF manager uses a sysplex-wide lock for this. Note that this locking is only used to serialize MQCONNX processing, it does not serialize against any other SALE accesses.

The following is a summary of how the MQSeries implementation serializes using a lock in the CF administrative structure.

Serialization is required across the following sequence of operations in MQCONNX:
1. Check if there is already a SALE with matching serialization token on the SALE list.
2. If not then create one.

The serialization is accomplished using a CF list lock, as follows:
1. Obtain a lock on the administrative structure. This is an unconditional request:
?IXLLSTC Request(LOCK)
LockIndex(eSALE_Lock_Index)
LockOper(SET)
LockMode(UNCOND) . . .

Note that this serializes correctly against other lock requests from the same queue manager.

If the request is refused (Ix1RsnCodePersistentLock) because the lock is held by a failed-persistent connector then the lock is forced off by releasing it on behalf of the failed connector):
?IXLLSTC Request(LOCK)
LockIndex(eSALE_Lock_Index)
LockOper(RESET)
LockComp(failed_conid) . . .

The request is then tried again. This is aggressive and could (though is unlikely to) result in stealing the lock from a connector who legitimately holds it. Subsequent list operations must be aware of this possibility.
2. Read SALEs selected by secondary key (the hashed serialization token) until either a SALE with matching serialization is read, or until all SALEs with matching secondary key have been checked and no match found.
   Note that the lock could (though it is unlikely to) be stolen during this processing. This is "harmless" if a matching SALE is found.

If there is a SALE with matching token then skip to step 4, otherwise:
3. Create a new SALE and write it to the CF administrative structure. It is unsafe to write the new SALE if the lock was stolen, so use HELDBY:
?IXLLSTE EntryType(NEW)
ListNum(eSALE_List Number)
Assign (KEY)
EntryKey(our_primary_key)
SecondaryKey(our_secondary_key)
VersUpdate(SET)
NewVers (our-version)
LockIndex(eSALE_Lock_Index)
LockOper(HELDBY) . . .
If this write fails (Ix1RsnCodeLockCond) because the lock was stolen then restart from step 1. Otherwise:
4. Release the lock:
?IXLLSTC Request(LOCK)
LockIndex(eSALE_Lock_Index)
LockOper(RESET)
It is possible that this call will fail (Ix1RsnCodeBadReset) because the lock was stolen but this does not matter.

In the IXLLSTx calls above, the symbol eSALE_Lock_Index is the low-order byte of the hashed serialisation token.

Note that if a queue manager failure occurs while the SALE list lock is (or locks are) held, restart processing should release the lock(s). Otherwise the queue manager may be unable to obtain the lock(s) in step 1 above following restart.

If an application thread fails while a lock is held, the lock must be released.

The lock provided by this system is persistent past the life of the holder and until all recovery across multiple queues and structures is complete.

The above provides a locking protocol that maps a serialization token to a list structure. The described embodiment is of serialization of applications acting on a queue sharing group of queue managers with the serialization mapping to a list structure in the coupling facility of the queue sharing group. Similar serialization could be implemented in a shared file system or a shared DB2 table or any other environment that is shared just as the coupling facility of the embodiment is shared.

In the example of the MQSeries queue manager application program, the "process" could be one of two types. A person skilled in the art will understand that other types of process could also be used in different environments. These two processes are described to give examples of the extent of the process to which a serialization token can be applied.

Single Thread Process

The process can comprise a single application thread, within which the application connects to the MQSeries queue manager with an explicit MQCONNX. The MQCONNX uses parameters to request single thread serialization and to specify the serialization token.

The process-active state starts when the application connects and ends when the application disconnects from the queue manager with explicit or implicit MQDISC.

Figure 4A:
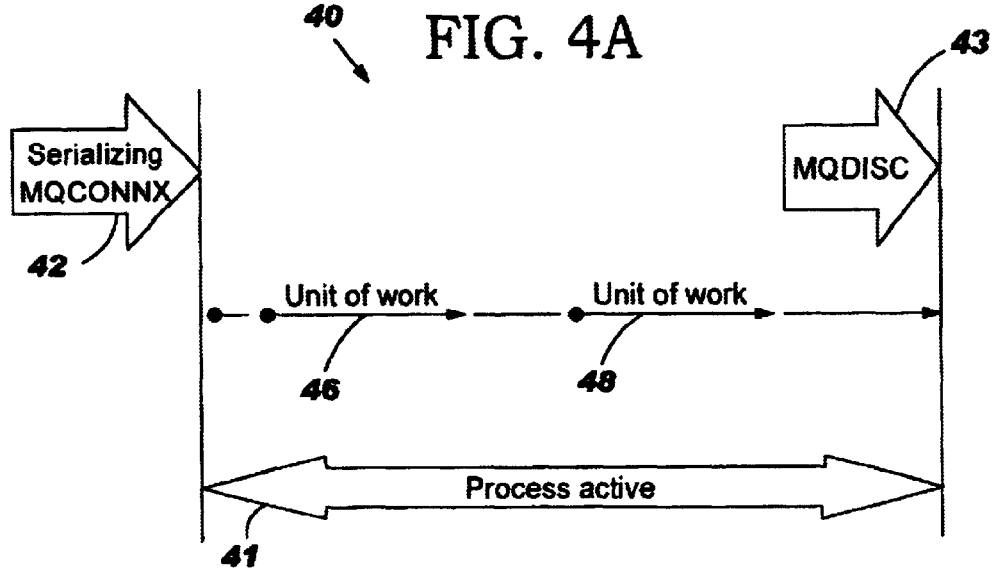
FIGS. 4a and 4b show representations of a single thread and multi-thread processes in accordance with the method and apparatus of the present invention.

This process is illustrated in FIG. 4a. FIG. 4a shows a process in an MQSeries application 40. The process starts with the explicit connection command MQCONNX 42 which indicates via the application programming interface that a process is commencing and that the process is a single thread serialization and the serialization token is specified. The single thread 44 contains units of work 46, 48 which take place one after the other. The process is active 41 during the time from the single thread MQCONNX command 42 until an explicit or implicit command of the thread, MQDISC 43. The serialization token is in force for the time that the process is active.

Multi-Thread Process

The process can comprise one or more application threads. Within each application thread, the application connects to the MQSeries queue manager with an explicit command, MQCONNX. The MQCONNX uses new parameters to request multi-thread serialization and to specify the serialization token.

The process-active state starts when the first thread connects and ends when the last thread disconnects with explicit or implicit MQDISC. This process is illustrated in FIG. 4b.

Figure 4B:
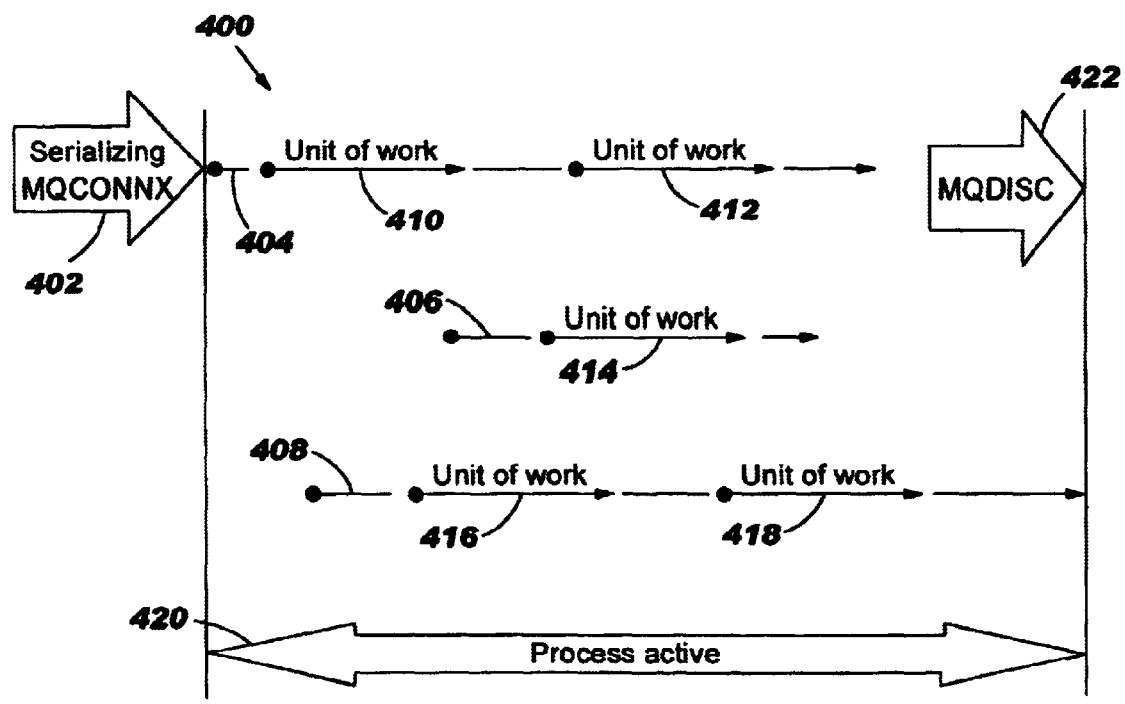

FIG. 4b shows a multi-thread MQSeries application 400. The process starts with the first explicit connect command, MQCONNX 402, of one of the threads and the multi-thread serialization token is enabled. Three multiple application threads 404, 406, 408 are shown in FIG. 4. Each application thread 404, 406, 408 contains units of work. For example, the first thread 404 contains two units of work 410, 412 which are carried out one after the other. A second thread 406 runs parallel to the first thread 404 and contains a single unit of work 414. A third thread 408 runs parallel to the other two application threads 404, 406 and contains two units of work 416, 418 which are carried out one after the other.

The multi-threaded application process is active 420 until the last thread disconnects with an explicit or implicit command, MQDISC 422. In the illustrated process in FIG. 4, the third thread 408 is the last to complete its units of work and when this thread 408 disconnects the process is no longer active and the serialization token is no longer in force.

In a multi-thread process, the multiple instances of the serialization token can be recovered in parallel in the event that a failure occurs.

For multi-thread processes, the MQSeries application needs to know for each MQCONNX whether it is part of an already-running process, or it is an attempt to start a new process. In the application programming interface, a multi-thread process is identified with an operating system address space. That is, threads which issue the multi-thread serialization MQCONNX from the same address space are part of the same process.

Other methods can be used, for example, the use of an instance number in which the same instance number is used for all threads in the same process. A different instance number is used for different process instances.

Various embodiments with differing commencement and termination arrangement of the serialization token are possible.

In one embodiment of the serialization application programming interface, the start of the process-active state occurs when the first or only thread connects to the queue manager (MQCONNX). This design does not depend on any association between the MQCONNX command and the start of a process, except that it can only serialize when a thread exists. This means that a process can start at or after the MQCONNX command.

Similarly, in an embodiment of the serialization application programming interface, the end of the process-active state occurs when the last or only thread disconnects from the queue manager.

Other embodiments are possible, for example, the process-active state could end when the last or only unit of work ends. That is, when the application explicitly or implicitly commits, backs out, or aborts a unit of work. This behaviour would allow an application programming interface to serialize individual units of work. For example, a begin verb could indicate the start of a unit of work with a serialization scope that extends to the end of that unit of work. This is illustrated in FIG. 5.

Figure 5:
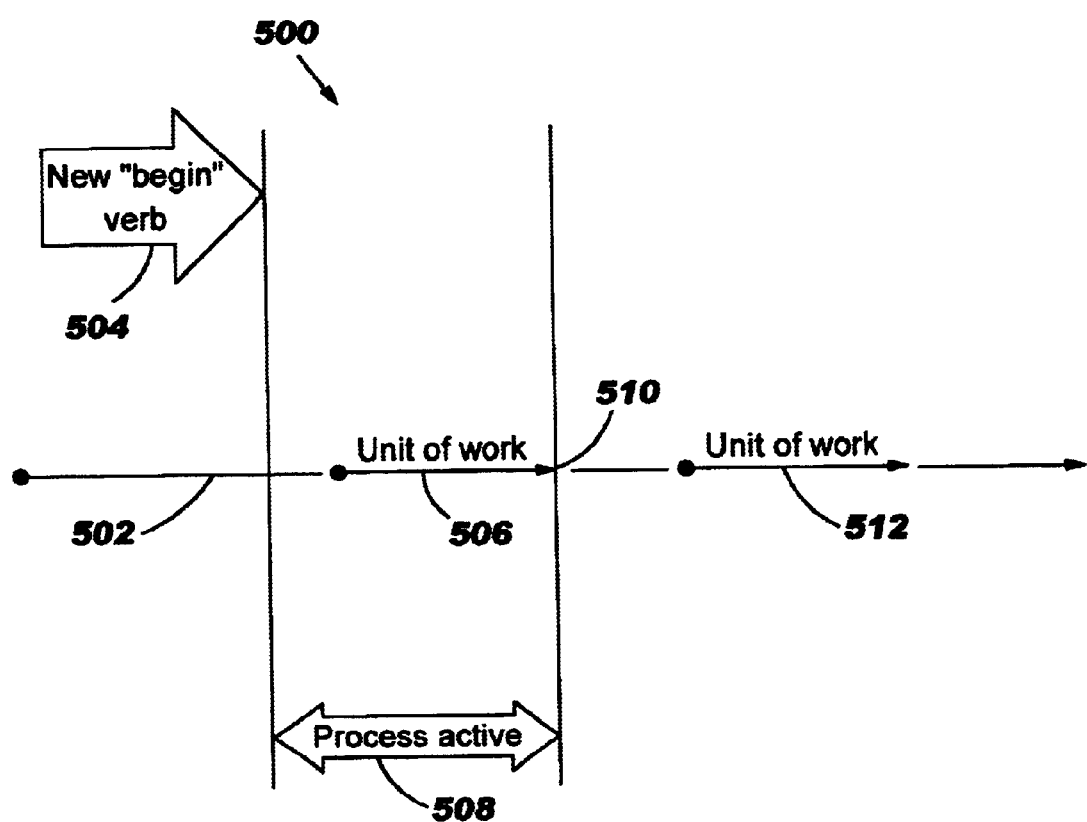
FIG. 5 shows a representation of a unit of work in a process in accordance with the method and apparatus of the present invention.

FIG. 5 shows a single thread 502 of an application 500. The single thread 502 is already in progress when a "begin" verb 504 indicates that a unit of work 506 will take place with an individual serialization token. The process is active 508 until the unit of work 506 ends 510. The thread 502 can continue with subsequent units of work 512 which are not included in the scope of the individual serialization token.

Alternatively, the process-active state and therefore the serialization token could end only when requested by an explicit application call. This behaviour would allow, for example, support for communicating multiple virtual address spaces running on an operating system (sysplexed processes) where different parts of the same process run on different operating system instances within a sysplex.

The method identified herein solves the problem where an application has a critical dependency on sequencing of data and/or on consistency of data. The serialization token is held for the period of time when a set of resources may not be in a consistent state and it is incorrect to start new instances of the application.

New instances of the application using the same serialization token will not be allowed to start if the serialization token is active. In the case where the original application had terminated abnormally, a new serialization token will only be allowed when all resources associated with the original instance of the token are restored to a consistent state and the serialization token is subsequently released. In the case where the original application is still active, a new serialization token will only be allowed when the application terminates.

The use of a serialization token provides a flexible application driven serialization technique.

Those skilled in the art will appreciate that computer readable instructions for carrying out the method described herein can be written in a number of programming languages for use with any computer architecture or operating system. Further, such instructions may be stored using any memory technology, present or future, or transmitted using any communications technology, present or future. It is contemplated that such a computer program product may be distributed as a removable media with accompanying printed or electronic documentation.

It will be recognized by persons skilled in the art that improvements and modifications can be made to the foregoing without departing from the scope of the present invention.

What is claimed:

1. A method for providing serialization support for a computer system resource which includes processes requiring serialization, the method including:
   commencing one of the processes requiring serialization;
   creating a representation of the process, the representation including a serialization token for the process;
   providing the representation on a medium accessible by all components of the computer system to which the serialization requirement applies;
   deleting the representation when the process is complete;
   on commencement of a further one of the processes requiring serialization, checking for the existence of the representation on said accessible medium and, if said representation check is positive, controlling serialization of said processes with reference to the serialization token.

2. A method as claimed in claim 1, wherein the serialization token has a locking protocol mapping to the representation.

3. A method as claimed in claim 1, wherein a serialization token for a process prevents other processes commencing during the time between the representation being provided on said medium and the representation being deleted.

4. A method as claimed in claim 1, wherein a serialization token for a process allows other processes having the same serialization token to commence before the step of deleting the representation.

5. A method as claimed in claim 1, wherein the representation includes at least one entry, each entry representing an element of the process, wherein each element can be performed independently.

6. A method as claimed in claim 5, wherein each entry is created, modified and deleted as the element is processed.

7. A method as claimed in claim 5, wherein, in the event of a failure during a process, the locking protocol is persistent until recovery across all the elements of the representation is complete.

8. A method as claimed in claim 5, wherein, in the event of a failure during a process, each element of the process is recovered to a consistent state and the corresponding entry in the representation is then deleted, the representation persisting until the last entry is deleted.

9. A method as claimed in claim 5, wherein each element of the representation can be performed and recovered in parallel with the other elements.

10. A method as claimed in claim 1, wherein the serialized processes run on a plurality of subsystems which share a storage space, and the representation is provided in the shared storage space.

11. A method as claimed in claim 10, wherein the shared storage space is one of a shared database, a shared file system or a coupling means between the subsystems.

12. A method as claimed in claim 10, wherein the computer system includes one or more queue manager programs and the serialized processes are message communication processes for communications between application programs connected to the queue manager programs, each process including at least one unit of work.

13. A method as claimed in claim 12, wherein the computer system uses an application programming interface to indicate to the queue manager programs the commencement of a process with a serialization token.

14. A method as claimed in claim 12, wherein the elements of the process represented by entries in the representation include threads of a process, units of work and individual queues on which units of work act.

15. A method as claimed in claim 14, wherein an entry for a unit of work is deleted when the unit of work is rolled forward or back for each queue that it acts on.

16. A method as claimed in claim 12, wherein the computer system is a plurality of subsystems each with a queue manager, the subsystems coupled together by a coupling means which has shared storage space on which the representation is stored in the form of a list structure.

17. A method as claimed in claim 16, wherein, in the event of a failure during a process, other queue managers can access the shared storage space to recover the elements of the process independently and in parallel.

18. A computer system having serialization support, the computer system comprising:

one or more components on which processes requiring serialization are run;

a medium, accessible by the one or more components, on which a representation of an active process is created during running of the process, and from which the representation is deleted when the process is complete;

means for creating the representation during running of a process and for deleting the representation when the process is complete; and means responsive to commencement of a further process requiring serialization for checking for the existence of the representation on said medium and, if said check is positive, for controlling serialization of said active process and said further process.

19. A computer system according to claim 18, wherein each process requiring serialization has a respective serialization token associated therewith and the serialization of said active process and said further process is performed with reference to said serialization token.

20. A computer system as claimed in claim 19, wherein the serialization token has a locking protocol mapping to the representation.

21. A computer system as claimed in claim 19, wherein a serialization token for a process prevents other processes commencing during the time that it is in force.

22. A computer system as claimed in claim 19, wherein a serialization token for a process allows other processes to commence if the serialization token allows for multiple processes.

23. A computer system as claimed in claim 18, wherein the representation includes at least one entry, each entry representing an element of the process, wherein each element can be performed independently.

24. A computer system as claimed in claim 23, wherein each entry is created, modified and deleted as the element is processed.

25. A computer system as claimed in claim 23, wherein each process requiring serialization has a respective serialization token associated therewith and the serialization of said active process and said further process is performed with reference to said serialization token, the serialization token having a locking protocol mapping to the representation, and wherein, in the event of a failure during a process, the locking protocol is persistent until recovery across all the elements of the representation is complete.

26. A computer system as claimed in claim 23, wherein, in the event of a failure during a process, each element of the process is recovered to a consistent state and the corresponding entry in the representation is then deleted, the representation persisting until the last entry is deleted.

27. A computer system as claimed in claim 23, wherein each element of the representation is capable of being performed and recovered in parallel with the other elements.

28. A computer system as claimed in claim 18, wherein the components of the computer system are a plurality of subsystems which share a storage space, and the representation is provided in the shared storage space.

29. A computer system as claimed in claim 28, wherein the shared storage space is one of a shared database, a shared file system or a coupling means between the subsystems.

30. A computer system as claimed in claim 28, wherein the subsystems are one or more queue manager programs and the serialized processes are message communication processes from application programs connected to the queue managers, each process including at least one unit of work.

31. A computer system as claimed in claim 30, wherein each process requiring serialization has a respective serialization token associated therewith and the serialization of said active process and said further process is performed with reference to said serialization token, and wherein the computer system uses an application programming interface to indicate to the queue manager programs the commencement of a process with a serialization token.

32. A computer system as claimed in claim 30, wherein the elements of the process represented by entries in the representation includes threads of a process, units of work and individual queues on which units of work act.

33. A computer system as claimed in claim 32, wherein an entry for a unit of work is deleted when the unit of work is rolled forward or back for each queue that it acts on.

34. A computer system as claimed in claim 30, wherein the computer system is a plurality of subsystems each with a queue manager, the subsystems coupled together by a coupling means which has shared storage space on which the representation is stored in the form of a list structure.

35. A computer system as claimed in claim 34, wherein, in the event of a failure during a process, other queue managers can access the shared storage space to recover the elements of the process independently and in parallel.

36. A method for providing serialization support for a computer system comprising a plurality of subsystems with a shared memory space, the subsystems having a plurality of processes, wherein a process is allocated a serialization token which has a locking protocol mapping to a list structure representing the process in the shared memory space, the locking protocol enabling the plurality of processes to serialize with each other.

37. A computer program product stored on a computer readable storage medium, comprising computer readable program code means for performing the steps of a method for serializing processes, the method including:

commencing one of a set of processes requiring serialization;

creating a representation of the process, the representation including a serialization token for the process;

providing the representation on a medium accessible by all components of the computer system to which the serialization requirement applies;

deleting the representation when the process is complete;

on commencement of a further one of the processes requiring serialization, checking for the existence of the representation on said accessible medium and, if said representation check is positive, controlling serialization of said processes with reference to said serialization token.

38. A method for providing serialization support for a computer system resource which includes processes requiring serialization, the method including:

commencing one of the processes requiring serialization;

creating a representation of the process and providing the representation on a medium accessible by all components of the computer system to which the serialization requirement applies;

deleting the representation when the process is complete;

on commencement of a further one of the processes requiring serialization, checking for the existence of the representation on said accessible medium and, if said representation check is positive, controlling serialization of said processes.

* * * * *